No. 741,439. PATENTED OCT. 13, 1903.
C. E. BAKER & A. W. BURWELL.
PROCESS OF TREATING ORES.
APPLICATION FILED DEC. 23, 1902.
NO MODEL.
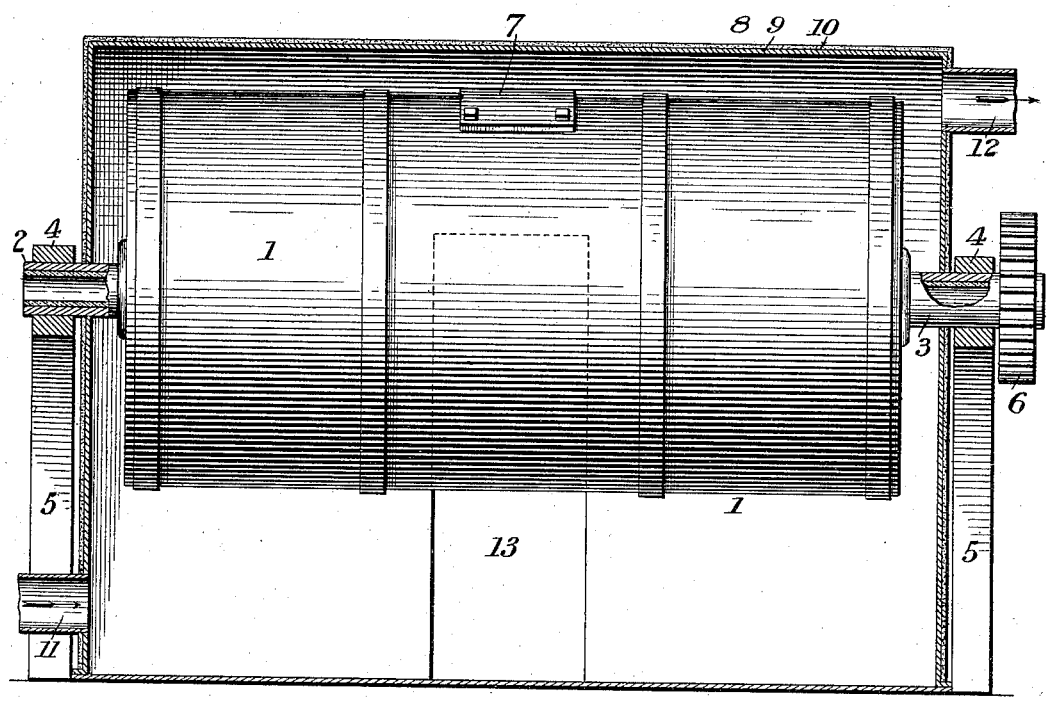
Witnesses:
R A Balderson
T R Sheppard
Inventors:
Charles E Baker,
Arthur W Burwell,
By Bynrs & Townsend
Att'ys.

No. 741,439. Patented October 13, 1903.

UNITED STATES PATENT OFFICE.

CHARLES E. BAKER AND ARTHUR W. BURWELL, OF CLEVELAND, OHIO.

PROCESS OF TREATING ORES.

SPECIFICATION forming part of Letters Patent No. 741,439, dated October 13, 1903.

Application filed December 23, 1902. Serial No. 136,420. (No specimens.)

*To all whom it may concern:*

Be it known that we, CHARLES E. BAKER and ARTHUR W. BURWELL, citizens of the United States, residing at Cleveland, in the county of Cuyahoga and State of Ohio, have invented certain new and useful Improvements in Processes of Treating Ores, of which the following is a specification.

This process is especially intended for the treatment of pyritic ores of nickel and copper, such as those of the Sudbury district, but can also be applied with advantage to other classes of ores.

In carrying out the process the ore is chlorinated, the chlorids of nickel, copper, and of iron if present are brought into solution, and a sulfate or sulfuric acid is added to the solution to convert the chlorids into sulfates. The metals are then recovered by first electrolytically depositing the copper, neutralizing the residual solution, and then electrodepositing the nickel, maintaining a current density below that which would cause deposition of iron. When sulfid ores are treated, the chlorination is preferably effected by treating the raw crushed ore with chlorin while subjected to a temperature sufficient to cause the chlorin to combine with sulfur to produce a volatile chlorid, which is driven off and may be condensed. To obtain the best results, both the ore and chlorin should be dry and the ore should be agitated to increase the speed of the reaction. The chlorination may be carried out by the use of any suitable apparatus. One which has been employed is shown in the accompanying drawing, in which the figure is a vertical longitudinal section showing the ore-drum in elevation.

The apparatus shown comprises a revolving drum 1, preferably of boiler-iron, lined with porcelain or lead. This drum has hollow trunnions 2 3, also lined with porcelain or lead, which are supported in journal-boxes 4, carried by standards 5. A gear-wheel 6 for rotating the drum is secured on trunnion 3. The drum has a suitable opening 7 for receiving and discharging its contents. Surrounding the drum is a chamber 8, which may be of boiler-iron 9, with a covering 10, of asbestos. The flue 11 opens into chamber 8 at one end and near its base, serving for the introduction of heating-gases. A flue 12 for discharging the waste gases leads from the other end of the chamber near its top. A door 13 at one side of the chamber gives access to the drum for the purpose of charging and discharging it.

For the sake of illustration the process will be described as carried out on an ore containing nickel, copper, and iron combined with sulfur. The ore is crushed to about fifty mesh and a sufficient amount is placed in the drum to one-third fill it. The drum is now set in rotation and its contents heated to about 150° centigrade, preferably by waste products of combustion introduced through flue 11. Dry chlorin gas is then introduced through trunnion 2 and combines with the sulfur to form sulfur chlorid $S_2Cl_2$. This chlorid, however, volatilizes at a temperature of 138° centigrade and is therefore driven off as rapidly as formed, escaping through trunnion 3, whence it is delivered to a suitable condenser and liquefied. The metals in the ore are thus converted into chlorids. Care should be taken to discontinue the introduction of chlorin gas at the precise moment when all of the sulfur has been removed, which can be determined by the fact that chlorin only then escapes through trunnion 3. This is necessary to prevent conversion of the ferrous chlorid into the more volatile ferric chlorid, which might be driven off with the sulfur chlorid. The residual mass is now treated with water, either in the drum or in a separate vessel, whereby the metal chlorids are brought into solution. In order to recover the metals from the solution, a sulfate or sulfuric acid is added to convert their chlorids into sulfates. The copper is then removed by electrolysis, using anodes of carbon, lead, or nickel, and an electromotive force insufficient to deposit nickel or iron. The solution is now neutralized and the nickel electrodeposited therefrom with a current density insufficient to effect the deposition of iron. Before depositing the nickel ammonium oxalate or other salt may be added to the solution to convert the nickel sulfate into such double nickel salt as may be desirable for electrolysis. The iron remaining in the solution may be electrodeposited, briqueted, and melted down.

We are aware that it has been proposed to desulfurize ores by finely pulverizing the ore, placing it in an air-tight chamber, and passing an excess of chlorin over the ore while agitated. The chlorin partially converts the sulfur into chlorid and the iron into ferric chlorid and the reaction generates sufficient heat to volatilize both these chlorids and free sulfur, the boiling-point of which is 448.4° centigrade. No heat is supplied to the ore, and while the heat generated by the reaction is at first so high that it is difficult to provide vessels which will withstand both the high temperature and the effects of chlorin as the sulfur on the surface of the particles of ore is removed the reaction lags and the temperature falls below that requisite to effect the removal of sulfur. Our process is distinct from this in that we supply heat to the ore and raise its temperature to about 150° centigrade—that is, to a point just sufficient to effectively drive off the sulfur chlorid. By thus supplying artificial heat we are enabled to keep up the temperature of the ore until the sulfur has been combined with chlorin and driven off. We also limit the supply of chlorin so that no ferric chlorid is produced. The ferrous chlorid being less volatile and the temperature of the ore being kept low, the iron remains with the other metals in the ore and an effective separation of the sulfur results.

The claims of this application are specifically distinct from those of our prior application, Serial No. 138,843, filed November 11, 1902, in that they are limited to the step of supplying heat to the ore.

We claim—

1. The process of treating ores containing a base metal or metals and a metalloid, which consists of combining the metal and metalloid with chlorin, and supplying sufficient heat to vaporize and separate the metalloid chlorid from the metal chlorids, as set forth.

2. The process of treating ores containing a base metal or metals and a metalloid, which consists of combining the metal and metalloid with chlorin by bringing chlorin into contact with the ore while hot, and supplying sufficient heat to vaporize and separate the metalloid chlorid from the metal chlorids, as set forth.

3. The process of treating ores containing a base metal or metals and a metalloid, which consists of combining the metal and metalloid with chlorin by bringing dry chlorin into contact with the ore while hot, and supplying sufficient heat to vaporize and separate the metalloid chlorid from the metal chlorids, as set forth.

4. The process of treating ores containing iron and a metalloid, which consists of converting the iron into ferrous chlorid and the metalloid into a chlorid, and supplying sufficient heat to vaporize and separate the metalloid chlorid from the ferrous chlorid, as set forth.

5. The process of treating ores of nickel, copper and iron, containing a metalloid, which consists of combining the metals and metalloid with chlorin, the iron being converted into ferrous chlorid, and supplying sufficient heat to vaporize and separate the metalloid chlorid from the metal chlorids.

6. The process of treating ores of nickel and copper containing a metalloid, which consists of combining the metals and metalloid with chlorin, and supplying sufficient heat to vaporize and separate the metalloid chlorid from the metal chlorids, as set forth.

7. The process of treating ores of nickel and copper containing a metalloid, which consists of combining the metals and metalloid with chlorin by bringing chlorin into contact with the ore while hot, and supplying sufficient heat to vaporize and separate the metalloid chlorid from the metal chlorids, as set forth.

8. The process of treating ores of nickel and copper containing a metalloid, which consists of combining the metals and metalloid with chlorin by bringing dry chlorin into contact with the dry ore while hot, and supplying sufficient heat to vaporize and separate the metalloid chlorid from the metal chlorids, as set forth.

9. The process of treating ores of nickel and copper containing a metalloid, which consists of combining the metals and metalloids with chlorin, supplying sufficient heat to vaporize and separate the metalloid chlorid from the metal chlorids, bringing the metal chlorids into solution, and converting the dissolved chlorids into sulfates, as set forth.

10. The process of treating ores of nickel and copper containing a metalloid, which consists of combining the metals and metalloid with chlorin, supplying sufficient heat to vaporize and separate the metalloid chlorid from the metal chlorids, bringing the metal chlorids into solution, converting the dissolved chlorids into sulfates, and separately recovering the copper and nickel from the sulfate solution, as set forth.

11. The process of treating ores of nickel, copper and iron, containing a metalloid, which consists of combining the metals and metalloid with chlorin, supplying sufficient heat to vaporize and separate the metalloid chlorid from the metal chlorids, bringing the metal chlorids into solution, converting the dissolved chlorids into sulfates, electrodepositing the copper, neutralizing the solution, and electrodepositing the nickel with a current density insufficient to deposit the iron, as set forth.

12. The process of recovering copper and nickel from a solution of their sulfates, which consists of electrodepositing the copper, neutralizing the solution, converting the nickel into a double oxalate, and electrodepositing the nickel, as set forth.

13. The process of recovering copper and nickel from a solution of sulfates of copper, nickel and iron, which consists of electrodepositing the copper, neutralizing the solution, and electrodepositing the nickel with a current density insufficient to deposit the iron, as set forth.

In testimony whereof we affix our signatures in presence of two witnesses.

CHARLES E. BAKER.
ARTHUR W. BURWELL.

Witnesses:
A. C. BOWEN,
T. E. STONE.